United States Patent
Beier

(10) Patent No.: US 10,041,410 B2
(45) Date of Patent: Aug. 7, 2018

(54) AERO ENGINE WITH A BEARING CHAMBER AND AN APPLIANCE FOR INTRODUCING OIL

(71) Applicant: Rolls-Royce Deutschland Ltd & Co KG, Blankenfelde-Mahlow (DE)

(72) Inventor: Juergen Beier, Schulzendorf (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 345 days.

(21) Appl. No.: 14/847,500

(22) Filed: Sep. 8, 2015

(65) Prior Publication Data

US 2016/0076449 A1 Mar. 17, 2016

(30) Foreign Application Priority Data

Sep. 11, 2014 (DE) .................. 10 2014 113 132

(51) Int. Cl.
*F02C 7/06* (2006.01)
*F01D 25/16* (2006.01)
(Continued)

(52) U.S. Cl.
CPC ............... *F02C 7/06* (2013.01); *F01D 25/18* (2013.01); *F02C 3/04* (2013.01); *F05D 2250/14* (2013.01);
(Continued)

(58) Field of Classification Search
CPC ........... F01M 13/04; F01M 2013/0422; F01D 25/18; F02C 7/06; F02C 7/32; B01D 45/12; F16N 7/32
(Continued)

(56) References Cited

U.S. PATENT DOCUMENTS 3,602,312 A * 8/1971 Rainaldi ............... A62C 99/009
169/47
4,453,784 A * 6/1984 Kildea .................... F01D 25/18
184/6.11
(Continued)

FOREIGN PATENT DOCUMENTS

DE 69607718 T2 11/2000
EP 0769631 A1 4/1997
(Continued)

OTHER PUBLICATIONS

European Search Report dated Feb. 4, 2016 for related European application No. 15183316.7.
(Continued)

*Primary Examiner* — Audrey K Bradley
*Assistant Examiner* — Kelsey Stanek
(74) *Attorney, Agent, or Firm* — Shuttleworth & Ingersoll, PLC; Timothy J. Klima

(57) ABSTRACT

An aero engine with a bearing chamber, which is confined by a first wall area and a second wall area which is embodied so as to be rotatable with respect to the first wall area and in which at least one bearing appliance as well as at least one appliance for introducing oil are arranged. Oil can be introduced into the bearing chamber via at least one appliance for introducing oil substantially against a rotational direction of the first wall area and/or of the second wall area and substantially tangentially to at least one surface of at least one wall area that is facing the bearing chamber.

19 Claims, 5 Drawing Sheets

(51) Int. Cl.
*F01D 25/18* (2006.01)
*F02C 3/04* (2006.01)
*F16C 33/66* (2006.01)

(52) U.S. Cl.
CPC .... *F05D 2250/232* (2013.01); *F05D 2260/98* (2013.01); *F16C 33/6659* (2013.01); *F16C 2360/23* (2013.01)

(58) Field of Classification Search
USPC ...................................... 415/110, 111, 124.1
See application file for complete search history.

(56) References Cited

U.S. PATENT DOCUMENTS

| | | |
|---|---|---|
| 5,261,751 A | 11/1993 | Heinz |
| 5,749,660 A | 5/1998 | Dusserre-Telmon et al. |
| 6,996,968 B2 | 2/2006 | Peters et al. |
| 7,384,197 B2 | 6/2008 | Plona |
| 2006/0159378 A1* | 7/2006 | Plona ..................... F16C 33/58 384/462 |
| 2009/0133961 A1 | 5/2009 | Corattiyil et al. |
| 2009/0134243 A1* | 5/2009 | Mount ..................... F01D 25/18 239/265.27 |
| 2015/0226266 A1* | 8/2015 | Mori ....................... F16C 33/76 384/467 |

FOREIGN PATENT DOCUMENTS

| | | |
|---|---|---|
| EP | 1681480 A2 | 7/2006 |
| JP | 2014062616 A * | 4/2014 |

OTHER PUBLICATIONS

German Search Report dated May 18, 2015 for related German Application No. 10 2014 113 132.0.
Braünling, Willy J. G., Flugzeugtriebwerke, Heidelberg, Springer, 2009, pp. 1376-1391, ISBN 978-3-540-76370-3.

* cited by examiner

AERO ENGINE WITH A BEARING CHAMBER AND AN APPLIANCE FOR INTRODUCING OIL

This application claims priority to German Patent Application 102014113132.0 filed Sep. 11, 2014, the entirety of which is incorporated by reference herein.

The invention relates to an aero engine with a bearing chamber which is confined by a first wall area and a second wall area that is embodied so as to be rotatable with respect to the first wall area, and in which a bearing appliance as well as at least one appliance for introducing oil are arranged.

In jet engines as they are known from practice, during operation oil-containing exhaust air coming from bearing chambers, among others, is supplied to an oil separator or a so-called breather that can be embodied as a centrifugal oil separator. The separation of large oil particles from the exhaust air or from the air-oil volume flows coming from the bearing chambers is effected by means of a deflection area that is provided in the area of the breather and that acts as a centrifuge. Oil particles with smaller diameters are caught by a metal foam that is arranged in the oil separator and are also filtered from the air in this manner. The oil that is separated in the area of the oil separator is resupplied to the oil circuit. The cleaned air is discharged overboard into the environment.

The air-oil volume flows that are supplied to the breather or the centrifugal oil separator from the bearing chambers have a high oil content, high temperatures and contain oil droplets with very small diameters. The small drop diameters are formed for example due to the fact that because of high rotational speeds of an engine shaft during operation of the gas turbine engine, oil is centrifuged outward in the direction of an external wall of the bearing chamber by a bearing that is provided in the area of the bearing chamber and is supplied with oil for lubrication. As the oil impinges on the external wall, the oil droplets that are centrifuged off from the bearing disperse, wherein the dispersed oil droplets have very small diameters.

The air-oil volume flows that are discharged from the bearing chambers and that carry the small oil droplets are supplied to the oil separator. However, due to their small size, the small oil droplets can be separated only to a limited extent in the area of the centrifugal separator, which is why an undesirably high share of oil is released into the environment through an outlet of the oil separator for the air flow, which is what causes the high oil consumption of presently used engines, among other things.

From U.S. 2009/0133961 A1, a gas turbine engine with a bearing chamber having a bearing is known. An air-oil mixture that is discharged from the bearing chamber is guided to an air-oil separator that is arranged in the area of an engine shaft, via which oil can be separated from the air-oil mixture. In order to cool the hot air-oil mixture, cool oil is sprayed via a nozzle into the air-oil mixture of the bearing chamber. A disadvantage that occurs in the described embodiment is that the air-oil mixture that is subsequently supplied to the air-oil separator and tempered has a relatively high share of oil droplets with small drop diameters, which in turn either cannot be separated from the air-oil mixture in the area of the air-oil separator or cannot be separated to the desired degree.

It is the objective of the present invention to create an aero engine of the kind that was mentioned initially, in which a share of small oil droplets in an air-oil mixture that is discharged from the bearing chamber is small.

This objective is solved by an aero engine including features as disclosed herein.

The aero engine according to the invention is embodied with a bearing chamber, which is confined by a first wall area and a second wall area that is embodied so as to be rotatable with respect to the first wall area, and inside of which a bearing appliance as well as at least one appliance for introducing oil are arranged.

In order to reduce the share of very small oil droplets in an air-oil mixture that is discharged from the bearing chamber as compared to known embodiments in a simple and efficient manner, oil can be supplied according to the invention into the bearing chamber via at least one appliance for introducing oil substantially against a rotational direction of the first wall area and/or of the second wall area and substantially tangentially to at least one surface of at least one wall area that is facing towards the bearing chamber.

As a result of the oil being introduced into the bearing chamber in the circumferential direction of the engine tangentially to the wall area of the bearing chamber and against a main flow direction of the air-oil mixture that is forming in the rotational direction of the wall area, a very high relative velocity between the air-oil mixture that is moving inside the bearing chamber and the oil that is introduced and collides with the oil in the air-oil mixture is achieved. The high relative velocity during an impact of the oil droplets of the air-oil mixture with the oil that is introduced into the bearing chamber via the appliance for introducing oil serves to support the merging of the introduced oil and the oil droplets of the air-oil mixture into oil droplets with drop sizes that can be separated to a desired degree in the area of a downstream oil separator. Here, in the area of the bearing chamber, the oil that is introduced via the appliance comes into contact with the oil droplets that are centrifuged into the bearing chamber from the bearing appliance without any contact to a wall area, as well as with oil droplets that are dispersed into smaller oil droplets after contact with a wall area of the bearing chamber. Coalescing of small oil droplets of the air-oil mixture with the introduced oil into larger oil droplets can also be supported if the introduced oil has a considerably lower temperature as compared to the air-oil mixture.

The oil droplets that are enlarged by the coalescing process can for example be separated from the air-oil mixture that is discharged from the bearing chamber in a simple manner by means of a cyclone or an air-oil separator, so that oil-loading of an air-oil volume flow that is flowing away in the direction of an environment can be considerably reduced as compared to known embodiments. For this purpose, the appliance for introducing oil is configured in such a manner that by introducing oil into the air-oil mixture in the area of the bearing chamber larger oil droplets are formed from the existing oil droplets, which have a higher share of oil droplets that are bigger than oil droplets which, due to their small size, cannot be separated from an air-oil mixture that is discharged from a bearing chamber or can only be separated with considerable effort.

In a constructionally simple embodiment of the aero engine according to the invention, the first wall area forms an external wall of the bearing chamber that is torque-proof during operation of the aero engine, and the second wall area forms an internal wall of the bearing chamber that is rotating during operation of the aero engine.

In a constructionally simple further development of the invention, the first wall area and the second wall area of the bearing chamber are connected to each other via a bearing appliance in a rotatable manner.

If oil can be introduced via the appliance for introducing oil at least into an area of the bearing chamber that is located close to a wall area, the number of oil droplets with a very small diameter in an air-oil mixture that is discharged from the bearing chamber can be strongly reduced. Through a drop-wall interaction of the oil that is spun off of the bearing appliance during operation of the aero engine, oil droplets with a very small diameter, for example smaller than 1 μm, are created in particular in areas that are close to the wall of the external wall of the bearing chamber. Through the introduction of oil by means of the appliance for introducing oil into an area of the wall area that is close to the wall, a greater number of such small oil droplets can be combined directly in the area where they are formed with the introduced oil to form large oil droplets, which in turn can subsequently be separated in a simple manner from the air-oil mixture that is discharged from the bearing chamber. For introducing oil into an area located close to the wall, the appliance preferably has an outlet opening or a discharge opening for oil that is arranged at a small radial distance from the respective wall area in the radial direction.

In an advantageous embodiment of the aero engine according to the invention, the oil can be introduced into the bearing chamber via the appliance for introducing oil in the form of a spray cone. Via the spray cone that is in particular located at only a small distance from a wall area and that, if necessary, at least in certain areas impinges on the wall area and has a substantially tangential main spraying direction, a collision of the oil from the appliance for introducing oil with a large number of small oil droplets is achieved in a simple manner following a drop-wall interaction of the oil that is spun off by the bearing appliance, so that a large share of oil droplets with a small diameter coalesces with the introduced oil to form oil droplets of a desired size.

In a particularly advantageous embodiment of an aero engine according to the invention, it is provided that the oil can be introduced into the bearing chamber via the appliance for introducing oil in the form of an elliptical spray cone, i.e. a straight taper having an elliptical footprint. In particular when a longer semi-axis of the spray cone substantially extends in the axial direction of the bearing chamber, a particularly large area of the bearing chamber that is located close to the wall can be impinged with the introduced oil by means of the appliance for introducing oil, and thus the diameter of many small oil droplets in the wall area can be increased.

In the area of an oil discharge opening, the appliance for introducing oil can have a deflection appliance for guiding or redirecting the oil that has to be introduced. In such an embodiment of the invention, oil can be introduced into the bearing chamber in a defined manner in a particularly simple way and to the desired amount.

In an advantageous further development of the invention, the deflection appliance is embodied with a convex area, whereby a desired distribution of the introduced oil can be adjusted in a particularly easy manner depending on the shape of the convex area of the deflection appliance. The convex area of the deflection appliance preferably has a convex curvature in the radial direction as well as in the axial direction of the bearing chamber and is for example embodied in a spoon-shaped manner at least approximately and at least in certain areas. Here, oil is guided through the appliance for introducing oil for example in the radial direction with respect to the bearing chamber via a conduit area in the direction of the deflection appliance and is deflected substantially tangentially to the wall area by means of the deflection appliance, preferably in the form of a spray cone.

In an advantageous embodiment of an aero engine according to the invention, the appliance for introducing oil has an elliptical oil discharge opening, with its long semi-axis preferably extending substantially tangentially to the wall area of the bearing chamber. With an appliance for introducing oil that is embodied in this way, a large area close to the wall that is located within the bearing chamber can be impinged with the introduced oil in a simple manner.

In principle, the appliance for introducing oil can be arranged in the circumferential direction of the bearing chamber in any desired position, preferably in the area of the external wall of the bearing chamber. However, what is particularly advantageous is the arrangement of an appliance for introducing oil in the area of an outlet opening for the air-oil mixture from the bearing chamber, since all oil droplets flowing from the bearing chamber pass through the outlet opening. The appliance for introducing oil can be arranged in a simple manner in the circumferential direction on the bearing wall upstream and/or downstream of the outlet opening.

Alternatively or additionally, an appliance for introducing oil can also be arranged in the area of an oil outlet from the bearing chamber. The arrangement of the appliance for introducing oil downstream or upstream of the oil outlet is particularly advantageous for the reason that a particularly high number of oil droplets with a very small drop diameter can be present in this area. This is due to the fact that oil in an oil film that forms during operation of the aero engine at the external wall of the bearing chamber is moved very fast in this area as the oil from bearing chamber is removed by suction and through this a drop break-off may occur at the surface of the oil film that is facing towards the bearing chamber.

In an advantageous embodiment of the invention, multiple, in particular two, three, four or five appliances for introducing oil are provided that are arranged respectively distributed across the circumference of a wall area or of both wall areas of the bearing chamber and at a distance to each other, but that also can be arranged so as to be offset with respect to one another in the axial direction of the bearing chamber. The more appliances for introducing oil are provided, the closer to the respective wall area an outlet or discharge opening of the appliance for introducing oil can be arranged.

However, through the spray cones that can be formed by the appliances for introducing oil, depending on the embodiment it is not necessary that all circumferential areas of the wall area of the bearing chamber can be reached by the introduced oil during operation of the aero engine. This applies, for example, when areas are present onto which no oil centrifuged by a bearing appliance impinges due to indentations or the like, and in the areas of which no drop-wall interaction takes place in the course of which undesirably small drops are created. The appliances for introducing oil are preferably positioned in such a manner that all areas in which a drop-wall interaction occurs during operation of the aero engine can be covered with oil by at least one appliance for introducing oil during operation of the aero engine.

In order to reduce in a simple manner the loading with oil of the air-oil mixture discharged through an outlet opening from the bearing chamber before the release of the air-oil mixture takes place, in one advantageous embodiment of an aero engine according to the invention an oil separator and/or a cyclone are arranged downstream of the outlet opening for the air-oil mixture from the bearing chamber.

Through the oil separator or breather and/or the cyclone, loading of the air-oil mixture with oil can be reduced in a simple manner and with little effort due to the high shares in oil droplets with large diameters. What is understood in the present case by an oil separator or a breather is in particular a centrifugal oil separator that has a deflection area which acts as a centrifuge. In the area of such a breather, oil particles with smaller diameters are caught by a metal foam that is arranged in the oil separator and are filtered from the air. The oil that is separated here is resupplied to an oil circuit of an aero engine, while the cleaned air is preferably discharged into the environment of an aero engine.

In the area of the cyclone or the centrifugal separator, the air as the carrier of the oil is set into a rotational motion by its own flow rate and an appropriate constructional design of the cyclone. The centrifugal forces acting on the oil droplets accelerate the oil droplets in the cyclone in a radially outward direction, and they are separated when they impinge on a limiting wall or a housing wall of the cyclone. In this way, the oil droplets are separated from the air flow, which is guided inwards and discharged.

The appliance for the introduction of oil can for example be embodied as a mist nozzle, so that it becomes possible to introduce a conical oil spray mist or a diffuse air-oil mist into the bearing chamber for example. The oil spray mist consists of drops that have defined diameters by which coalescing with oil droplets in the air-oil mixture in the area of the bearing chamber is supported.

In principle, the oil loading of the air-oil mixture within the bearing chamber is elevated my means of the at least one appliance for introducing oil from a first level to a second level as compared to an identical embodiment without an appliance for introducing oil. However, with the solution according to the invention, an oil load can be decreased downstream of an oil separator and/or a cyclone in a simple manner to a level that is lower than a loading level in a comparable aero engine, in which no appliance for introducing oil is provided in the area of the bearing chamber.

Further advantages and advantageous embodiments of the aero engine according to the invention follow from the patent claims and the exemplary embodiments that are principally described in the following by referring to the drawings, wherein, with view to clarity, in the description of the different exemplary embodiments the same reference signs are used for structural components having the same design and functionality.

Herein:

Figure 1:
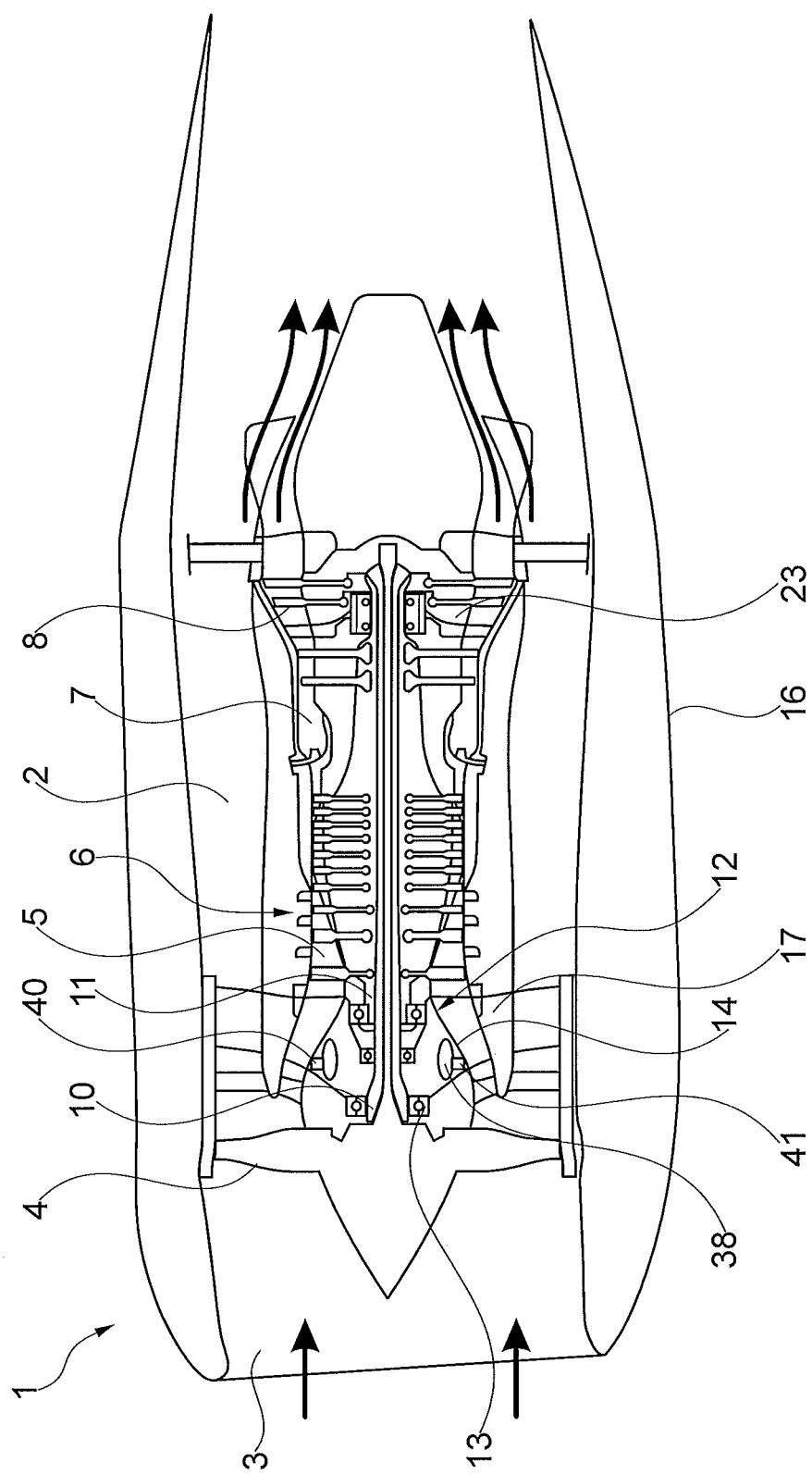
FIG. 1 shows a strongly schematized longitudinal section view of an aero engine, wherein two appliances for introducing oil into the bearing chamber that are arranged in the area of a front bearing chamber can be seen.

In FIG. 1, an aero engine or jet engine 1 is shown in a longitudinal section view. The aero engine 1 is embodied with a bypass duct 2 and an inlet area 3, wherein a fan 4 connects to the inlet area 3 downstream in a per se known manner. Downstream of the fan 4, the fluid flow in the aero engine 1 is in turn divided into a bypass flow and a core flow, wherein the bypass flow flows through the bypass duct 2 and the core flow flows into an engine core 5, which again is embodied in a per se known manner with a compressor appliance 6, a burner 7 and a turbine appliance 8.

In the present case, the aero engine 1 is embodied with two shafts, namely a high-pressure shaft 9 and a low-pressure shaft 10, wherein for the mounting of the shafts 9, 10 below each other and opposite an engine shroud 11 different bearing appliances are provided, which are respectively arranged in bearing chambers 12. In the front bearing chamber 12, a bearing appliance 13 is mounted for mounting of the low-pressure shaft 10 opposite a housing appliance 14 that is torque-proof during operation. In principle, though, the solution according to the invention is not limited to the front bearing chamber 12 and can be used in all bearing chambers of the aero engine 1, for example also in aero engines with a three-shaft embodiment.

Figure 2:
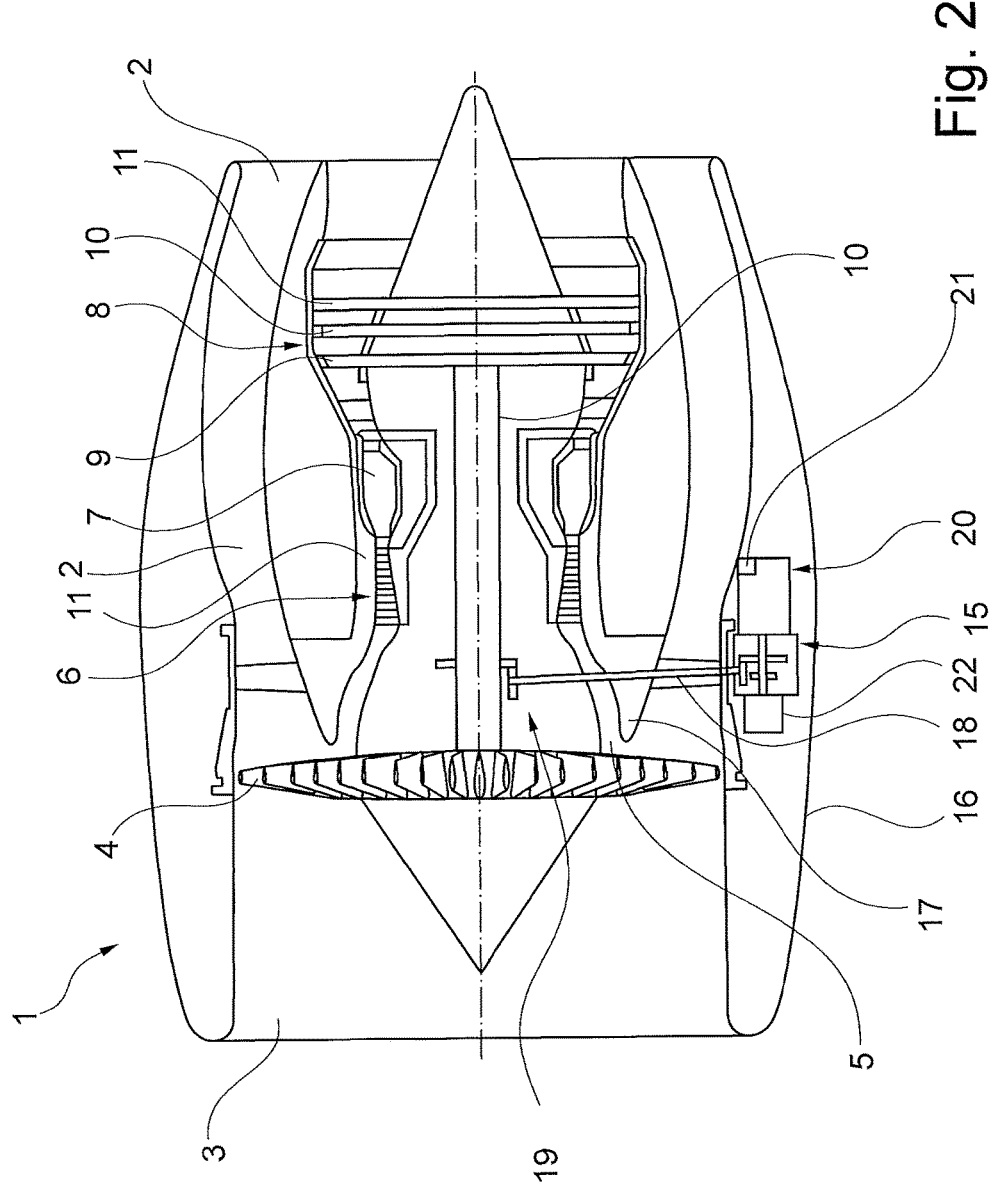
FIG. 2 shows a simplified longitudinal section view of the aero engine according to FIG. 1 with an auxiliary unit gear appliance that is arranged in the area of a fan housing.

FIG. 2 again shows a longitudinal section view of the aero engine 1 in which, in contrast to the rendering of the aero engine 1 according to FIG. 1, also an auxiliary unit gear appliance 15 is shown. In the present case, the auxiliary unit gear appliance 15 is arranged in the area of an exterior engine shroud 16 that confines the bypass duct 2 and represents the exterior circumferential area of the aero engine 1. As an alternative to this, in a further embodiment of the invention the auxiliary unit gear appliance can for example also be arranged in the area of a structural component 17 that is [extending] in a radial direction between the bypass duct 2 and the engine core 5 and confining the bypass duct 2 as well as the engine core 5. In the present case, the auxiliary unit gear appliance 15 is connected to the low-pressure shaft 10 via a drive shaft 18 that is extending in radial direction of the aero engine 1 and via an inner gear 19, and is thus driven or supplied with a torque by the low-pressure shaft 10 during operation of the jet engine 1.

The auxiliary unit gear appliance 15 supplies different auxiliary units 20 and an oil separator 21, which is also referred to as a breather, with a torque of a desired strength. In addition, in the area of the auxiliary unit gear appliance 15, also an oil tank 22 is provided, which represents a hydraulic fluid reservoir from which oil for cooling and lubricating various areas of the aero engine 1, such as the bearing appliances 13, the gear wheel pairs of the inner gears 19 and the auxiliary unit gear appliance 15 as well as further assembly groups of the aero engine 1 that need to be cooled and lubricated, is extracted.

Figure 3:
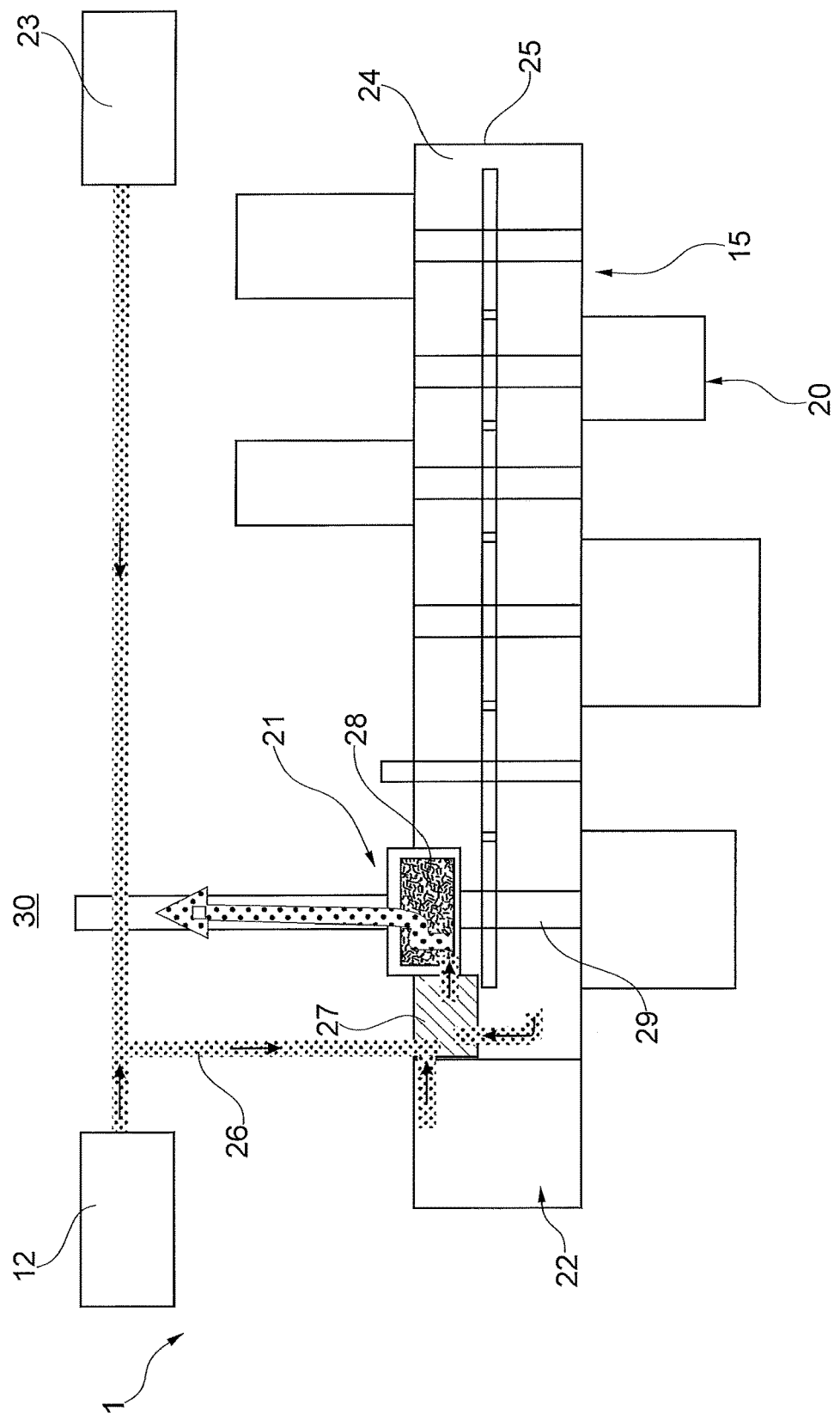
FIG. 3 shows a strongly schematized partial representation of the aero engine according to FIG. 1 and FIG. 2 with an oil separator that is arranged in the area of the auxiliary unit gear appliance.

FIG. 3 shows, in a strongly schematized form, that part of the aero engine 1 in which the auxiliary unit gear appliance 15 is arranged. In the present case, the oil separator 21 is connected to the oil tank 22, the front bearing chamber 12, a rear bearing chamber 23, as well as an interior space 24 of a housing 25 of the auxiliary unit gear appliance 15, which represent all oil-impinged areas of the aero engine 1. During operation of the aero engine 1, the bearing chambers 12, 23 are impinged with oil from the oil tank 22 for the purpose of lubrication and cooling.

In the embodiment of the aero engine 1 that is shown in FIG. 3, an air-oil volume flow from the front bearing chamber 12 and the rear bearing chamber 23 can respectively be guided in the direction of a conduit area 26, which in the present case leads into a pre-chamber 27 that is located upstream of the oil separator 21. Furthermore, in the present case the oil tank 22 is also connected to the pre-chamber 27, so that an air-oil volume flow from the oil tank 22 as well as the air-oil volume flows of the bearing chambers 12 and 23 can be tangentially introduced into the pre-chamber 27 via the conduit area 26. Apart from that, the interior space 24 of the housing 25 of the auxiliary unit gear appliance 15 is also coupled to the pre-chamber 27, wherein if an appropriate application of pressure of the interior space 24 is present, an air-oil volume flow from the housing 25 of the auxiliary unit gear appliance 15 is also tangentially introduced into the pre-chamber 27. The pre-chamber 27 is connected to the oil separator 21, in the interior space of which a porous area 28 is arranged in a rotatable manner, through which the air-oil volume flow that is flowing from the pre-chamber 27 can pass.

In the present case, the porous area 28 can be driven by the auxiliary unit gear appliance 15 via a gear wheel 29 and acts as a centrifuge so as to reduce as far as possible the share of oil in the air-oil volume flow that flows through the porous area 28. Here, the oil share of the air-oil volume flow in the oil separator 21 is reduced in the area of the porous area 28 on the one hand like with passing an impact filter, and on the other hand like when separating the oil from the air in the area of a centrifuge through the rotation of the porous area 28. The oil that is filtered out of the air-oil volume flow in the area of the porous area 28 is suctioned off in the exterior area of the oil separator 21 in a manner that is not shown in more detail by means of a pumping appliance and guided back into the oil tank 22. The air flow that is flowing from the oil separator 21 in the direction of the environment 30 has a very low oil load, so that during operation of the aero engine 1 no trail of smoke that is visible from outside is created.

In the area of the oil separator 21, oil droplets with a very small diameter of approximately 1 μm can only be separated to a limited degree. In the bearing chambers 12, 23, oil that is supplied during the operation of the aero engine 1 for the purpose of lubrication is centrifuged by the rotation of the respective shaft 9, 10 from the bearing appliances 13 in the direction of an external wall area 32 of the bearing chamber 12, 23. This leads to the formation of oil droplets with small drop diameters. The drop diameters that are respectively formed in the area of the bearing chamber 12, 23 vary depending on the temperature in the area of the bearing chamber 12, 23 and the rotational speed of the respective shaft 9, 10. Also, in the area of an outlet opening 37 for the air-oil mixture from the bearing chamber 12, 23 oil droplets with a smaller diameter, preferably smaller than 1 μm, can be present due to the individual geometric design. In the following, it will be described in more detail how a share of oil droplets in an air-oil mixture that is discharged from the bearing chambers 12, 23 can be reduced as compared to known embodiments.

Figure 4:
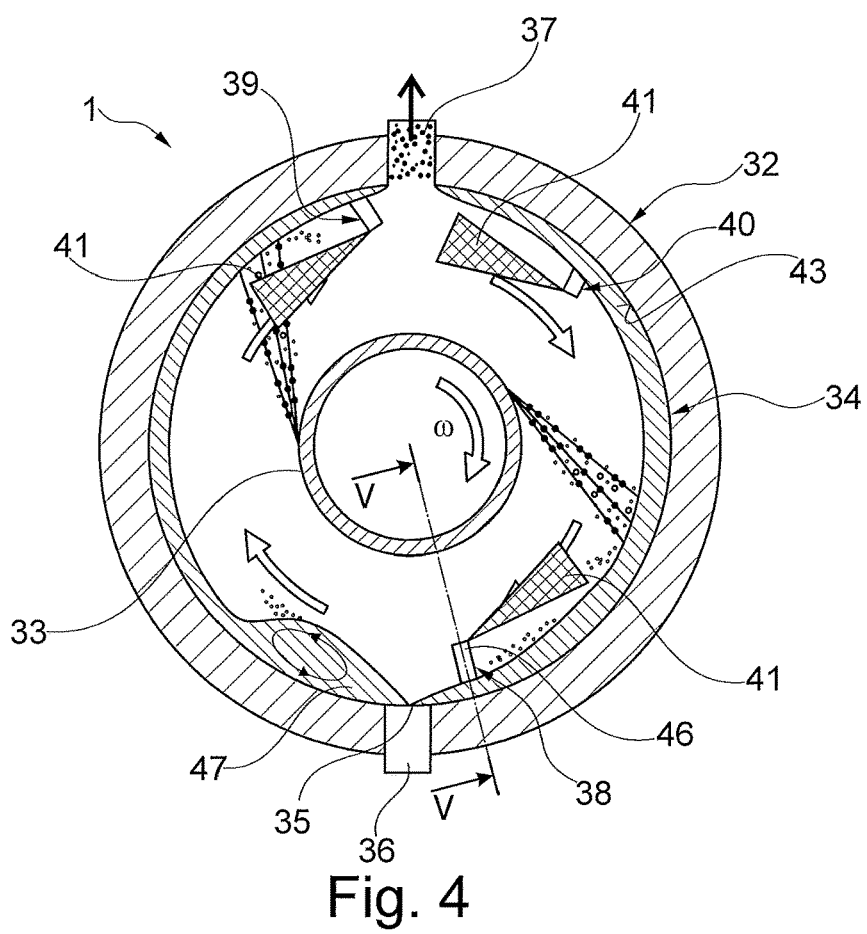
FIG. 4 shows a strongly simplified cross-sectional rendering of the front bearing chamber of the aero engines according to FIG. 1 to FIG. 3, wherein three appliances for introducing oil can be seen.

In FIG. 4, a sectional representation through the front bearing chamber 12 of the aero engine 1 is shown in a strongly simplified manner, wherein the bearing chamber 12 is confined by an internal wall area 33 of the low-pressure shaft 10 and an external wall area 32, among other things.

The internal wall area 33 and the external wall area 32 are connected to each other in the present case via the bearing appliance 13, wherein the internal wall area 33 rotates during operation of the aero engine 1 with respect to the external wall area 32 that is mounted in a torque-proof manner.

In principle, the oil droplets in the area of the bearing chamber 12 move through the rotation of the internal wall area 33 as an air-oil mixture in a main flow direction, which substantially corresponds to the rotational direction of the internal wall area 33. In the area of the external wall area 32, in particular a closed oil film 34 is formed during operation of the aero engine 1 that is sucked by a pumping appliance 36 out of the bearing chamber 12 in the area of an oil outlet 35 that is arranged in a bottom area of the bearing chamber 12 and is conveyed in the direction of the oil tank 22. The air-oil mixture that is present in the area of the bearing chamber 12 flows out of the bearing chamber 12 via an outlet opening 37 that is arranged in a top area of the bearing chamber 12 and is supplied to the oil separator 21 for the purpose of separating oil from the air-oil volume flow in the manner as has been described in more detail above.

During operation of the aero engine 1, oil from the bearing appliance 13 is centrifuged—in a manner so as to be distributed around the entire circumference of the internal wall area 33—in the direction of the external wall area 32 due to the high rotational speeds of the internal wall area 33 or the low-pressure shaft 10 during operation of the aero engine 1. In FIG. 4, this is shown by way of example based on two areas of the internal wall area 33. The oil that is centrifuged from the bearing appliance 13 has been previously supplied to the bearing appliance 13 via an oil lubrication that is not shown in any more detail.

Already the lubrication oil that comes out of the bearing appliance 13 can have a drop size that is too small for the oil separator 21. In addition, as the oil droplets that are centrifuged by the bearing appliance 13 radially outward impinge on the external wall area 32 or on the external wall of the bearing chamber 12, they are split up into smaller droplets to the extent as it has been described above, whereby their diameter is further reduced.

In order to keep the share of those oil droplets of the air-oil mixture that is discharged from the bearing chamber 12 that have a diameter size of approximately less than 1 μm as low as possible, three appliances 38, 39, 40 for introducing oil are provided in the present case in the area of the bearing chamber 12. The appliances 38, 39, 40 are substantially embodied in a structurally identical manner, so that, with view to clarity, the constructional design and the functionality of the appliances 38 to 40 will be described based on appliance 38 in the following.

Figure 5:
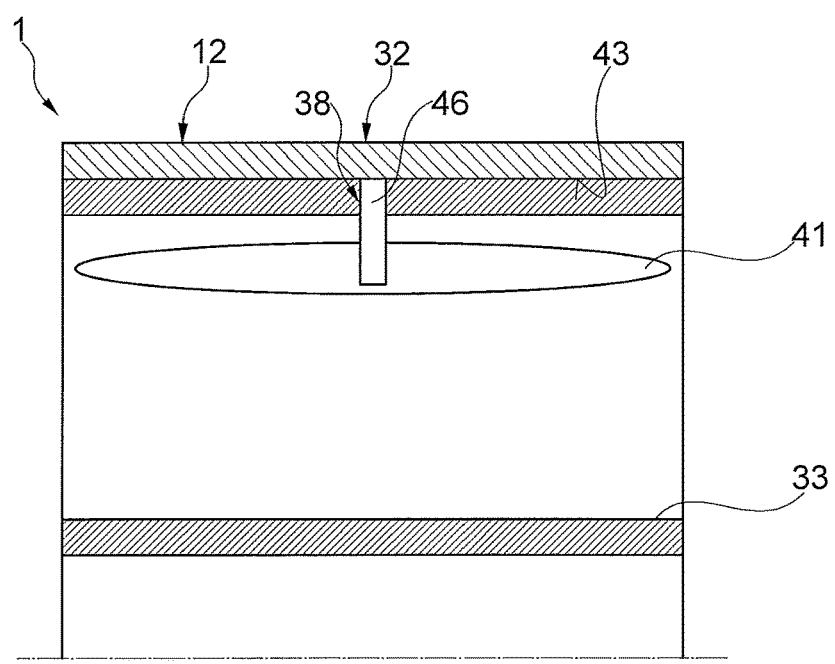
FIG. 5 shows a strongly simplified section of a sectional view of the bearing chamber according to FIG. 4 along the line V-V.
Figure 6:
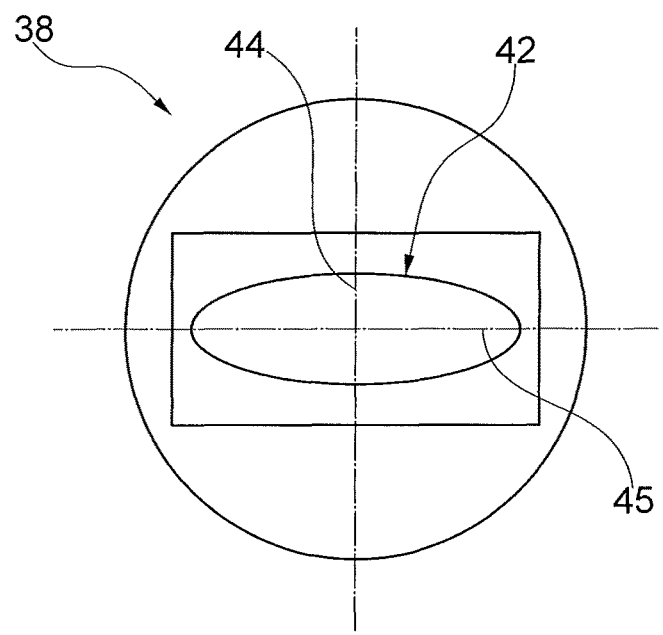
FIG. 6 shows a strongly simplified isolated rendering of a part of the appliance for introducing oil of the aero engine according to FIG. 1 to FIG. 5.

In the present case, oil can be guided into the bearing chamber 12 in an area that is close to the external wall area 32 by means of appliance 38 in the form of a spray cone 41 that is shown in FIG. 4 and in FIG. 5, or in the form of a conical oil film via a discharge opening 42 of the appliance 38 that can be seen in more detail in FIG. 6, with a pressure of approximately 1.2 bar usually being present in the bearing chamber. In order to be able to form a spray cone 41 that is as well-directed as possible, the oil is introduced into the bearing chamber 12 via the appliance 38 for introducing oil with a pressure of for example 3 bar to 12 bar, in particular 4 bar to 9 bar. Here, the external wall area 32 of the appliance 38 on which oil impinges via the spray cone 41 is bigger the higher the pressure difference between the supply pressure of the oil that is introduced via the appliance 38 and the pressure in the bearing chamber 12 is.

The discharge opening 42 is arranged inside the area of an area 46 of the appliance 38 that is shown in FIG. 5 and that extends substantially in the radial direction, wherein the oil that is guided via the appliance 38 to the discharge opening 42 is redirected in the present case by substantially 90° from a radial direction to a substantially tangential direction that is oriented against a rotational direction of the internal wall area 33 before it reaches the discharge opening 42. Here, the discharge opening 42 of the appliance 38 is embodied in an elliptical manner, so that an elliptical spray cone, i.e. a straight spray cone with an elliptical footprint, is formed by the appliance 38. An opening angle of the spray cone 41 or of the conical oil film can be adjusted via the discharge opening 42. In the schematic rendering according to FIG. 6, the discharge opening 42 has a short first semi-axis 44 that extends substantially in the radial direction of the bearing chamber 12, and a second semi-axis 45 that is preferably multiple times as long and that substantially extends in the axial direction of the bearing chamber 12.

Through the discharge opening 42 of the appliance 38, a spray cone 41 can be created in a simple manner, by means of which a large area of the external wall area 32 of the bearing chamber 12 can be impinged with oil. In this way, a greater number of small oil droplets that in particular are created through an interaction of oil droplets and wall is captured by the oil that is introduced via the appliance 38, thus coalescing with this oil into larger oil droplets. In the present case, coalescing of the oil droplets of the air-oil volume flow and of the introduced oil is supported respectively by gravitational forces between the individual oil droplets, wherein the tendency of the oil droplets to merge into larger oil droplets grows as the ratio between the diameters of the oil droplets increases.

The tendency of the oil droplets of the oil that is introduced or sprayed-in via the appliance 38 to coalesce with the oil droplets in the area of the bearing chamber 12 can additionally be increased if the introduced oil has a considerably reduced temperature as compared to the air-oil mixture that is present in the bearing chamber 12. In addition, the merging of the oil droplets of the air-oil mixture of the bearing chamber 12 with the oil that is introduced into the bearing chamber 12 via the appliance 38 is enhanced as the relative velocity between the air-oil mixture in the bearing chamber 12 and the oil introduced by the appliance 38 becomes higher.

In the present case, the appliance 38 for introducing oil is arranged upstream of the oil outlet 35 in a vicinity of the oil outlet 35 with respect to the rotational direction of the internal wall area 33 and with respect to the circumferential direction of the bearing chamber 12. In this area, oil droplets with a very small diameter are increasingly present in the air-oil mixture of the bearing chamber 12, since in this area the oil film 34 is suctioned with a high speed in the direction of the oil drain 35, and apart from the small oil droplets that are created through the drop-wall interaction, also such oil droplets with small diameters are present in the air-oil mixture that detach from the surface of the oil film 34 because of the suction vacuum and are hard to separate from the air-oil mixture of the bearing chamber 12. Through the previously described introduction of oil via the appliance 38, the small oil droplets of the air-oil mixture in this area coalesce with the oil that is sprayed-in by the appliance 38 to form larger oil droplets, which can be separated with little effort in the area of the oil separator 21.

With respect to the rotational direction of the internal wall area 33, a so-called recirculation zone 47 is formed upstream of the oil outlet 35 due to the flow conditions in the oil film 34, in the area of which the oil film 34 has a greater film thickness in the radial direction of the bearing chamber 12. In a transition between the recirculation zone 47 and an area, in which the film thickness of the oil film 34 is reduced in the radial direction of the bearing chamber 12, dynamic conditions support a detachment of oil droplets from the oil film 34. Therefore it can be advantageous to also provide an appliance for introducing oil, which is not shown in any more detail in FIG. 4, in such a transitional area of the oil film 34, with the spray cone of the appliance making it possible to impinge with oil preferably that area where the detachment of the oil droplets from the recirculation zone 47 occurs, in order to also increase the diameters of oil droplets that are present close to the transitional area, which have a critical diameter for a separation in the oil separator 21, and namely to such a degree, that a separation in the area of the oil separator can be enhanced.

In the present case, the further appliance 39 for introducing oil is arranged upstream of the outlet opening 37 with respect to the rotational direction of the internal wall area 33 and close to the outlet opening 37 for the air-oil mixture from the bearing chamber 12, while in the present case the appliance 40 for introducing oil is arranged downstream of the outlet opening 37 with respect to the rotational direction of the internal wall area 33. The arrangement of the appliance 40 does not impact a pressure within the bearing chamber 12 in a negative way through the oil sprayed-in via the appliance 40.

With the oil that is introduced via the appliances 38 to 40 into the bearing chamber 12, a major part of the air-oil mixture that is flowing out from the bearing chamber 12 through the outlet opening 37 can be impinged with oil before it exits the bearing chamber 12, in order to achieve a distribution of oil droplet diameters in the air-oil mixture in the area of the bearing chamber 12 that is favorable for subsequent oil separation. Here, what is aimed at is a distribution which has only a low share of oil droplets, which cannot be separated or cannot be separated to a sufficient extent by the oil separator 21 due to their diameters.

Apart from the shown embodiment with three appliances 38, 39, 40, principally also only one or two appliances for introducing oil can be provided in the area of the bearing chamber 12. Likewise, it is also possible to provide any number of additional appliances for introducing oil, wherein it has been basically determined that the more appliances for introducing oil are provided, the smaller the respective distance at which the spray cone created by the appliances 38 to 40 is arranged to the respectively associated area of the external wall area, while a major part of the small oil droplets that are created through the drop-wall interaction in the areas close to the wall still coalesces with the sprayed-in oil to form larger oil droplets.

Figure 7:
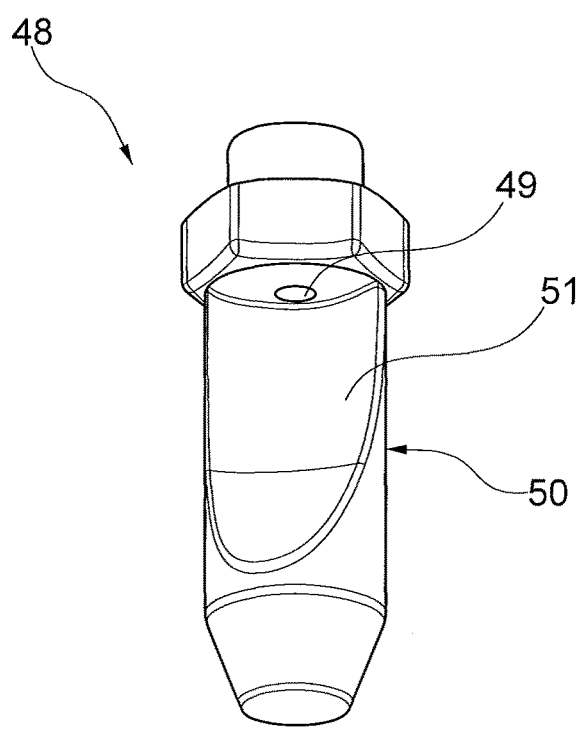
FIG. 7 shows a strongly simplified three-dimensional view of a part of an alternatively embodied appliance for introducing oil.

Apart from the already described embodiment of appliance 38 for introducing oil with the elliptical discharge opening 42, FIG. 7 shows another appliance 48 for introducing oil into the bearing chamber 12. By means of the appliance 48 according to FIG. 7, oil is first guided substantially in the radial direction in the area of the appliance 48, and after having passed an oil discharge opening 49 that is circular here impinged on a deflection appliance 50. The oil is redirected in the area of an area 51 of the deflection appliance 50 which in this example is embodied in a spoon-shaped manner. In the present case, the area 51 of the deflection appliance 50 has a curvature in the radial direction as well as in the axial direction of the bearing chamber 12.

The curvatures of the area 51 of the deflection appliance 50 in the axial or radial direction of the bearing chamber 12, that may for example be embodied in the form of a circle sector or of a section of an ellipse, are chosen in such a way, that through the deflection in the area of the deflection appliance 50 the oil is introduced into the bearing chamber 12 in the form of a spray cone that substantially corresponds to the spray cone 41.

Via the chosen form of the curvature of the area 51 of the deflection appliance in the radial direction of the bearing chamber 12, an opening angle of the spray cone of the oil that is introduced via the appliance 48 is adjustable in a substantially radial direction of the bearing chamber 12, whereas via a form of the curvature of the area 51 of the deflection appliance 50 in the axial direction of the bearing chamber 12 an opening angle of the spray cone of the oil introduced via the appliance 48 is adjustable in a substantially axial direction of the bearing chamber 12.

PARTS LIST 1 aero engine, jet engine
2 bypass duct
3 inlet area
4 fan
5 engine core
6 compressor appliance
7 burner
8 turbine appliance
9 high-pressure shaft
10 low-pressure shaft
11 engine shroud
12 front bearing chamber
13 bearing appliance
14 housing appliance
15 auxiliary unit gear appliance
16 exterior engine shroud
17 structural component
18 drive shaft
19 inner gear
20 auxiliary units
21 oil separator
22 oil tank
23 rear bearing chamber
24 interior space of the auxiliary unit gear appliance
25 housing of the auxiliary unit gear appliance
26 conduit area
27 pre-chamber
28 porous area of the oil separator
29 gear wheel of the auxiliary unit gear appliance
30 environment
32 external wall area of the bearing chamber
33 internal wall area of the bearing chamber
34 oil film
35 oil outlet
36 pumping appliance
37 outlet opening
38 appliance for introducing oil
39 appliance for introducing oil
40 appliance for introducing oil
41 spray cone
42 discharge opening of the appliance for introducing oil
43 surface of the external wall area
44 first semi-axis of the discharge opening
45 second semi-axis of the discharge opening
46 area of the appliance
47 recirculation zone
48 appliance for introducing oil
49 oil discharge opening
50 deflection appliance
51 area of the deflection appliance

The invention claimed is:

1. An aero engine comprising:
a bearing chamber that is confined by a first wall area and a second wall area which is rotatable with respect to the first wall area;
a bearing arranged in the bearing chamber;
an oil injector including an oil discharge opening arranged in the bearing chamber for introducing oil into the bearing chamber counter to a rotational direction of at least one chosen from the first wall area and the second wall area and tangentially to at least one surface of the at least one chosen from the first wall area and the second wall area that is facing an interior of the bearing chamber.

2. The aero engine according to claim 1, wherein the first wall area forms a stationary external wall during operation of the aero engine and the second wall area forms a rotating internal wall of the bearing chamber during operation of the aero engine.

3. The aero engine according to claim 2, wherein the first wall area and the second wall area of the bearing chamber are connected to each other in a rotatable manner via the bearing.

4. The aero engine according to claim 3, wherein the oil injector introduces the oil into an area of the bearing chamber that is close to the at least one chosen from the first wall area and the second wall area.

5. The aero engine according to claim 4, wherein the oil injector introduces the oil into the bearing chamber as a spray cone.

6. The aero engine according to claim 5, wherein the oil injector introduces the oil into the bearing chamber as an elliptical spray cone.

7. The aero engine according to claim 6, and further comprising a deflector positioned in a discharge path of the oil discharge opening.

8. The aero engine according to claim 7, wherein the deflector includes a convex area.

9. The aero engine according to claim 1, wherein the oil discharge opening is elliptical.

10. The aero engine according to claim 1, wherein the oil injector is arranged in the area of an outlet opening for an air-oil mixture from the bearing chamber.

11. The aero engine according to claim 1, wherein the oil injector is arranged in an area of an oil outlet from the bearing chamber.

12. The aero engine according to claim 1, and further comprising a plurality of the oil injector respectively arranged to be distributed over a circumference of the at least one chosen from the first wall area and the second wall area.

13. The aero engine according to claim 1, and further comprising at least one chosen from an oil separator and a cyclone arranged downstream of an outlet opening for an air-oil mixture from the bearing chamber.

14. The aero engine according to claim 1, wherein the first wall area and the second wall area of the bearing chamber are connected to each other in a rotatable manner via the bearing.

15. The aero engine according to claim 1, wherein the oil injector introduces the oil into an area of the bearing chamber that is close to the at least one chosen from the first wall area and the second wall area.

16. The aero engine according to claim 1, wherein the oil injector introduces the oil into the bearing chamber as a spray cone.

17. The aero engine according to claim 1, wherein the oil injector introduces the oil into the bearing chamber as an elliptical spray cone.

18. The aero engine according to claim 1, and further comprising a deflector positioned in a discharge path of the oil discharge opening.

19. The aero engine according to claim 18, wherein the deflector includes a convex area.

\* \* \* \* \*